May 23, 1939.  C. M. HYLE  2,159,380
CHRONOLOGICAL GAS-RECORDING APPARATUS
Filed Sept. 23, 1935  3 Sheets-Sheet 1
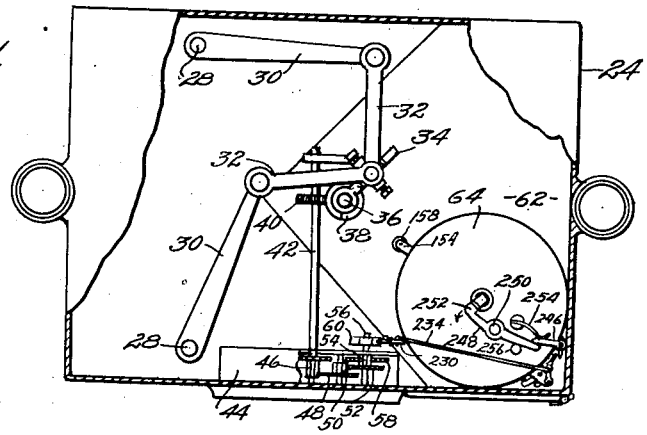
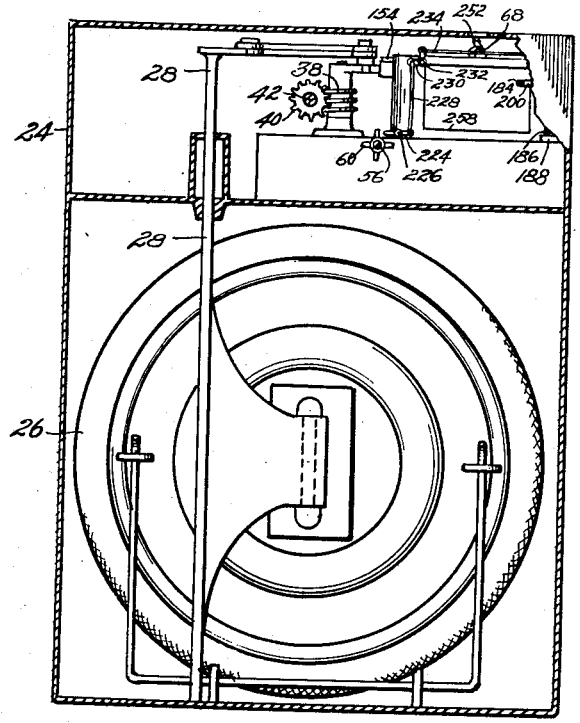
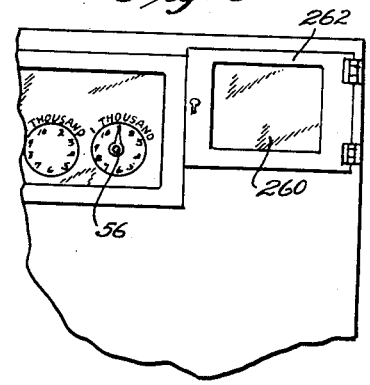
INVENTOR,
Carrie M. Hyle.
BY Hovey & Hamilton
ATTORNEYS.

May 23, 1939.  C. M. HYLE  2,159,380
CHRONOLOGICAL GAS-RECORDING APPARATUS
Filed Sept. 23, 1935  3 Sheets-Sheet 2
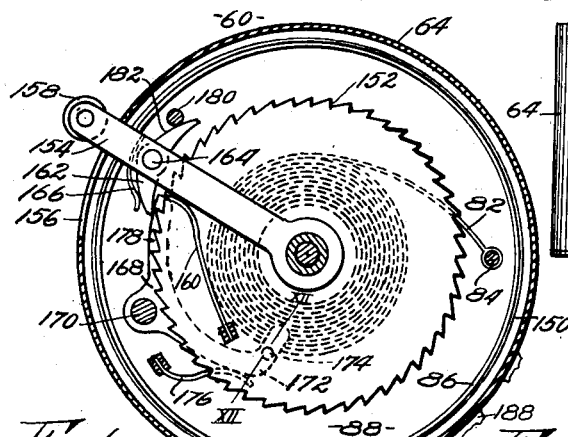
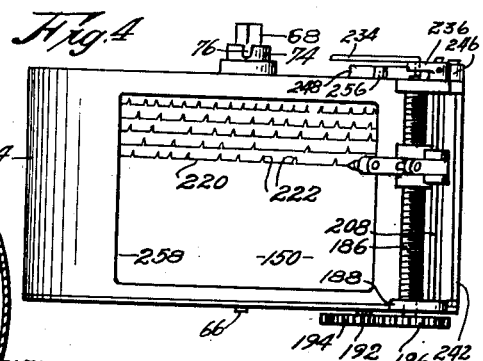
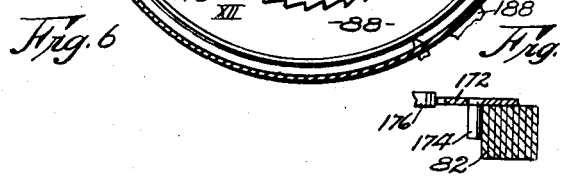
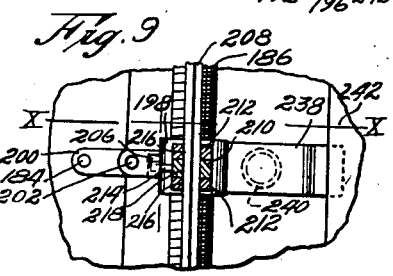
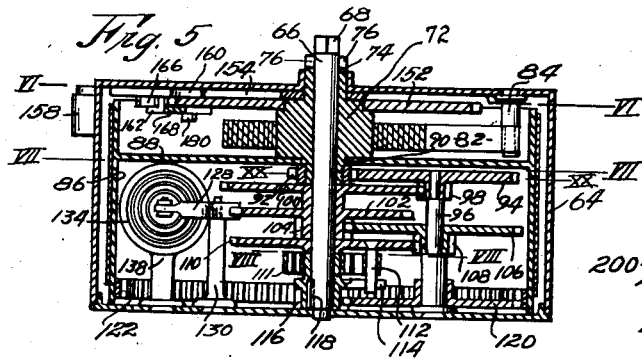
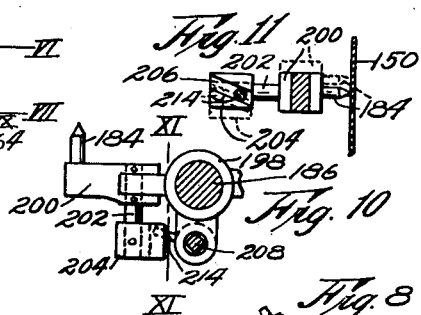
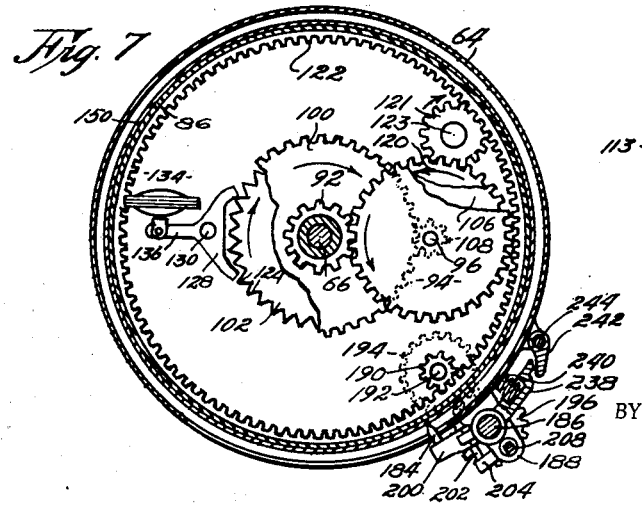
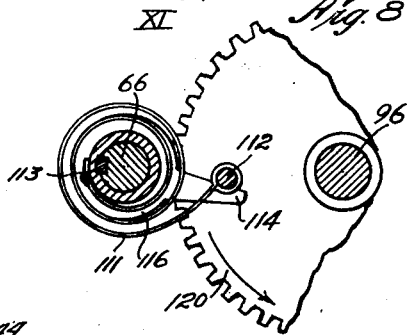
INVENTOR.
Carrie M. Hyle.
BY
Hovey & Hamilton
ATTORNEYS.

May 23, 1939.  C. M. HYLE  2,159,380
CHRONOLOGICAL GAS-RECORDING APPARATUS
Filed Sept. 23, 1935  3 Sheets-Sheet 3
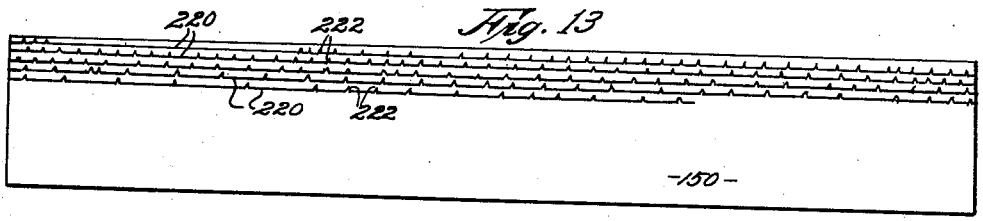
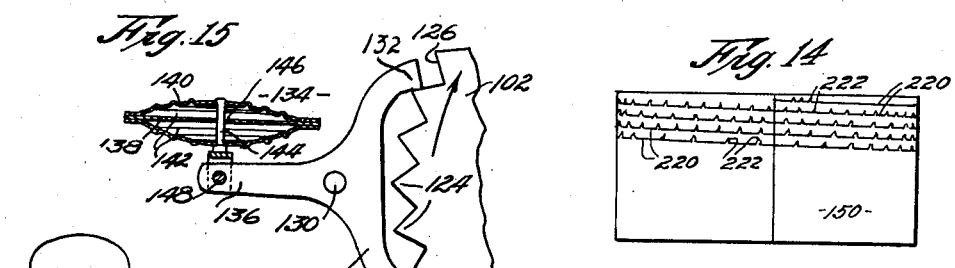
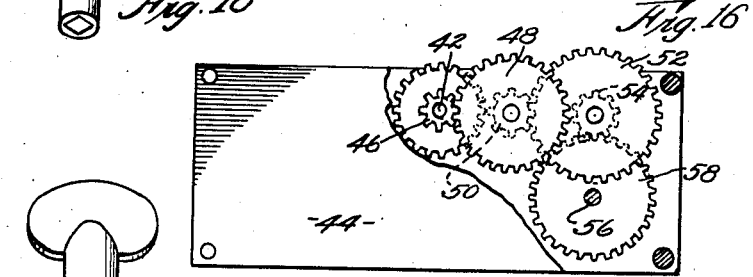
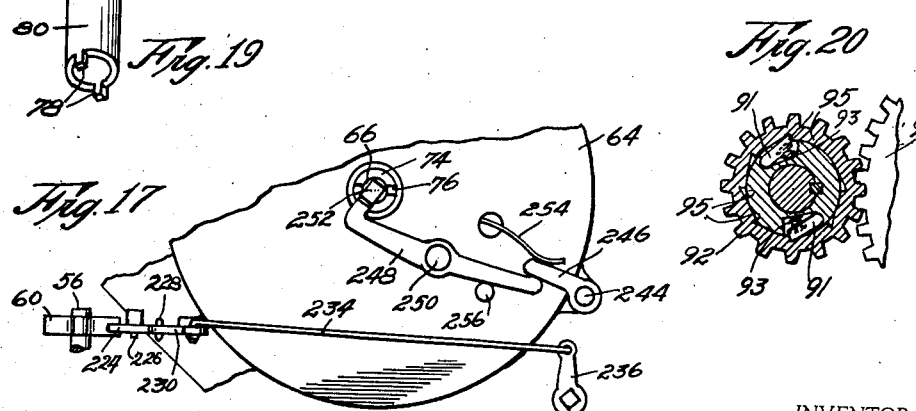
INVENTOR,
Carrie M. Hyle.
BY
Hovey & Hamilton
ATTORNEY.

Patented May 23, 1939

2,159,380

UNITED STATES PATENT OFFICE 2,159,380

CHRONOLOGICAL GAS-RECORDING APPARATUS

Carrie M. Hyle, Kansas City, Mo.

Application September 23, 1935, Serial No. 41,697

5 Claims. (Cl. 73—232)

This invention relates to improvements in chronological gas recording apparatus and especially to chronological gas recording apparatus adapted to be attached to and operated by the present commercially used gas meters.

The commercially used gas meters of today have means for indicating the quantity of gas used in a given time, but do not have any way of determining just when each unit volume of gas passed through the meter. It has been brought to the attention of the gas companies that certain ways and means have been devised by the consumer, whereby they may shunt the gas around the ordinary indicating means or so control said indicating means for a period of time that only a part of the gas used will be indicated.

The present invention contemplates means to detect this pilfering of the gas by indicating on a chart each predetermined unit volume of gas at the time it was used. It is apparent that should the record on the chart show that for an unusually long time during a month's period no gas was used, when ordinarily the consumption should have been quite large, the gas company will be put on its guard and can investigate to determine the cause.

The principal object of this invention is to provide a chronological gas recording apparatus as an attachment to a gas meter, operable by parts arranged to be operated by gas passing through the meter, to record predetermined unit volumes of gas on a chart as they pass through the gas meter.

A further object of this invention is to provide a chronological gas recording apparatus which is adapted to be operated by means arranged to be moved by the flow of gas through a gas meter to record predetermined units of gas on a rotating chart as they pass through said meter.

Another object of the invention is the provision of gas recording means associated with a gas meter having a crank arm and a relatively slowly rotating shaft arranged to be operated by gas passing through the gas meter, and having a rotatably mounted chart operable by said crank arm, and a stylus operable by said slowly rotating shaft to record predetermined unit volumes of gas at the time they pass through said meter.

A still further object resides in the provision of recording apparatus of the character described which is simple in construction, inexpensive to manufacture, and accurate in its operation.

With the foregoing, together with other objects and advantages as may hereinafter appear, reference will now be had to the drawings, wherein:

Figure 1 is a plan view of a gas meter, partly broken away and showing a chronological gas recording apparatus associated therewith embodying this invention.

Fig. 2 is a vertical, sectional view of said gas meter and associated parts.

Fig. 3 is a fragmentary, side elevation of the gas meter.

Fig. 4 is an enlarged elevation of the recorder with certain of the operating parts broken away.

Fig. 5 is a vertical, central section of the recorder.

Fig. 6 is a horizontal, sectional view, taken on line VI—VI of Fig. 5.

Fig. 7 is a horizontal, sectional view, taken on line VII—VII of Fig. 5.

Fig. 8 is an enlarged, fragmentary view, taken on line VIII—VIII of Fig. 5.

Fig. 9 is an enlarged, fragmentary, sectional view of a portion of the stylus operating mechanism.

Fig. 10 is a horizontal, sectional view, taken on line X—X of Fig. 9.

Fig. 11 is a sectional view taken on line XI—XI of Fig. 10.

Fig. 12 is a vertical, fragmentary, sectional view, taken on line XII—XII of Fig. 6.

Fig. 13 is a reduced, stretch-out view of the chart.

Fig. 14 is a detached view of the chart positioned in cylindrical form as used in actual operation.

Fig. 15 is an enlarged, detailed view of the time governed escapement.

Fig. 16 is a view of the train of gears interconnecting the gas-driven crank shaft of the meter and the slowly rotating shaft of the index.

Fig. 17 is a fragmentary, detailed view of certain of the parts controlling the movement of the stylus.

Fig. 18 is a perspective view of a key used in rotating the chart for observation.

Fig. 19 is a key adapted to initially wind the spring of the chronometer.

Fig. 20 is an enlarged, sectional view taken on line XX—XX of Fig. 5.

Throughout the several views, like reference characters indicate similar parts and the numeral 24 designates a gas meter casing, having mounted therein the usual bellows or diaphragm 26, through which the gas passes to cause an oscillation of the flag rods 28, thereby oscillating flag arms 30 that, through the intermediacy of links 32, cause a rotation of the tangent or crank arm 34. This crank arm is rigidly attached to crank shaft 36, on which is mounted a worm 38. A worm gear 40, mounted on an index axle 42, is in mesh with worm 38 so as to be rotated thereby. This index axle serves to operate an index 44 to indicate the amount of gas passing through the gas meter.

Referring to Fig. 16, it will be observed that axle 42 carries a pinion 46 which meshes with gear 48 having securely attached thereto pinion 50. This pinion 50 drives gear wheel 52, provided with pinion 54, that in turn drives a slowly revolving shaft 56 through the intermediacy of gear wheel 58. This shaft 56, as shown, when rotated through one revolution, indicates that one thousand cubic feet of gas has passed through the meter. All of the parts thus far described are old in the art and shown in Patent Number 1,629,031, issued May 17, 1927.

For use in the present invention, shaft 56 is extended sufficiently outwardly from the index housing to receive a toothed operating member 60. The chronological recording apparatus 62 is provided with a closed cylindrical housing 64, having an axially mounted shaft 66 therein for rotation. This shaft extends upwardly beyond housing 64 and is squared as at 68 to receive on operating key 70, as shown in Fig. 18. Rotatably mounted on the upper portion of shaft 66 is an arbor 72, having a reduced portion 74 extending through housing 64 and provided with slots 76 which are adapted to receive projecting lugs 78 of key 80, shown in Fig. 19.

Securely attached to arbor 72 is a spirally formed spring 82 that is secured at its outer end to a stationary pin 84 carried by housing 64. A drum 86, concentrically mounted in housing 64, is provided with a transverse partition 88. This partition has an opening 90 at its central portion which is adapted to receive the reduced lower end of arbor 72. The lower end of drum 86 is adapted to extend to the lower wall of housing 64. Arbor 72 is reduced at its lower end to receive the ratchet-driven pinion 92. Pawls 91 are normally forced outwardly by springs 93 to engage notches 95 formed in the inner wall of pinion 92. Pinion 92 is in operative relation with gear 94, rotatably mounted on spindle 96, carried by housing 64. Integral with gear 94 is a pinion 98 that drives gear 100.

Integral with the hub of gear 100 is an escapement wheel 102 and a pinion 104. Pinion 104 drives gear 106, having a rigidly attached pinion 108 which in turn operates the driving gear 110. Intermediate the periphery and axis of driving gear 110 is a securely mounted, downwardly extending pin 112. This pin is adapted to engage a lever 114 which is rigidly attached to a pinion 116 secured to the lower end of shaft 66 by means of a key 118. Pin 112 rotates in the direction indicated by the arrow in Fig. 8, thereby causing pinion 116 to move and drive gear 120 mounted on spindle 96. For reasons hereinafter set forth, it becomes necessary to rotate drum 86 through a substantially complete revolution independently of the position of pin 112. This is accomplished through the means of key 70 engaging shaft 66 and rotating it in reverse direction from which it is driven by pin 112. When so rotated, it is necessary that it again be returned to its original position with arm 114 resting against pin 112. This is accomplished through the use of a spiral spring 111, which is attached at its inner end 113 to the hub of pinion 116 and its outer end to pin 112. This structure is clearly shown in Fig. 8.

Gear 120 is positioned in operative relation with pinion 121 mounted on stub shaft 123, which in turn is secured to housing 64. This pinion meshes with internal gear 122, carried by drum 86. It is therefore apparent that when spring 82 unwinds, thereby causing arbor 72 to rotate, drum 86 will also be rotated.

Due to the train of gears just described, the speed of rotation of the drum 86 will be relatively slow, however, in order to cause an extremely low rotation of 86, which should be about one revolution in thirty days, I have provided a novel escapement device which is clearly shown in Figs. 5, 7 and 15. It will be observed that the escapement wheel 102 is provided with V-shaped teeth 124 that have inclined surfaces 126. The escapement arm 128 is mounted for oscillation at 130 and is provided with wheel-engaging portions 132 so that as wheel 102 rotates in the direction indicated by the arrow, pressure will be exerted against the contacting end 132, thereby causing 128 to oscillate intermittently in opposite directions.

In order to retard the speed of oscillation of 128, a diaphragm dash pot 134 is associated with the outer end 136 of 128. This dash pot comprises a stationary frame member 138, having a diaphragm 140 at its opposite sides to form chambers 142. These diaphragms are centrally attached to a stem 144 that passes through an opening 146 formed in 138 and is secured at its outer end to 136 by means of pin 148. The hole 146 is slightly larger than stem 144, thereby allowing the passage of oil contained in chambers 142 therethrough as pressure is exerted alternately on the diaphragms by the action of the escapement wheel 102. It is very apparent that by simply varying the size of the opening in 138 the speed of travel of the escapement wheel can be changed so as to obtain any desired timing of the rotation of drum 86. Drum 86 carries a chart 150, which may be secured thereto in any suitable manner.

It is the intention of this invention to provide means whereby spring 82 will be wound by the movement of crank arm 34. This is accomplished through the following mechanism. A ratchet wheel 152 is securely attached to arbor 72 and rotates therewith. Pivotally mounted on the reduced upper portion of arbor 72 is an operating lever 154, which extends through a slot 156 formed in the side wall of housing 64. This lever is provided with a contact roller 158, normally held in the path of travel of crank arm 34 by means of a spring 160. At each revolution of crank arm 34, operating lever 154 is moved through an arc a sufficient distance to permit the pawl 162 to engage the teeth of ratchet wheel 152 and wind spring 82. Pawl 162 is pivoted at 164 to operating lever 154 and is maintained in ratcheting relation with 152 by spring 166.

In view of the fact that the number of rotations of crank arm 34 may vary due to the quantity of gas being used, it becomes necessary to provide means whereby the operating lever 154 may oscillate when spring 82 is completely wound without exerting any undue pressure on the parts of the recorder. This is accomplished through the use of a guard member 168, pivoted intermediate its ends at 170 to housing 64. The inner end 172 of guard member 168 is provided with a depending pin 174 which extends in the path of travel of spring 82 and is resiliently held thereagainst by means of spring 176 carried by housing 64. The outer end 178 of 168 is formed to extend slightly beyond the ratchet teeth and to serve as a guide for the operating end of pawl 162 when spring 82 is completely wound.

It is apparent that when spring 82 is unwound to any material degree, it will force pin 174 outwardly, thereby exposing the teeth of ratchet wheel 152 to the action of pawl 162 and permit further winding of spring 82. With this type of winding mechanism it is apparent that spring 82 will be maintained in the wound position at all times during the operation of the meter. Should the meter be inoperative for an unusual long period, spring 82 might become inoperative and in that instance, before starting the meter in use again, it might be advisable to first wind the spring through the use of key 80. However, this need not be done since as soon as gas starts flowing through the meter, crank arm 34 will rotate and operate lever 154 to wind the chronometer spring. In order to permit the unwinding of spring 82 without interference from pawl 162, a pin 180, carried by housing 64, is adapted to engage the inclined surface 182 of pawl 162.

Associated with chart 150 and carried by housing 64, is a stylus 184, which is adapted to form a continuous mark on said chart as the same is rotated. In order to utilize a cylindrical chart as shown for a long period of time without the necessity of any attention by the operator, it is desired to move the stencil very slowly in a direction transverse to the direction of rotation of the chart. This is accomplished through the use of a screwthreaded rod 186, rotatably carried by housing 64 through the intermediacy of bearing members 188. This rod 186 is driven by internal gear 122 through pinion 190, mounted on shaft 192, which in turn is carried by housing 64, through which it extends.

The lower end of shaft 192 is provided with a gear wheel 194 which meshes with gear 196, secured to the lower end of 186. A threaded carriage member 198 is operatively positioned on 186 and serves to carry the stylus arm 200 that is pivoted thereto by means of pin 202. This pin is provided at its outer end with a rigidly attached operating block 204, that has an inclined groove 206. Mounted in bearings 188 in parallel relation with 186, is a square rod 208 that carries a slidably mounted pin oscillating member 210, positioned between two ears 212 extending outwardly from 198. A pin 214, rigidly attached to 210, is adapted to normally rest in groove 206, as clearly shown in Fig. 11. Openings 216 formed through ears 212 are sufficiently large to allow free rotation of 208, while opening 218 in 210 is square to substantially fit 208.

As stated above, line 220 traced on chart 150 by stylus 184 would normally be in a substantially straight line, thereby producing a helical or thread-like line about said chart as it is rotated. It is desired that when a predetermined volume of gas passes through the gas meter, some indication shall be produced on said chart to indicate the exact time that the gas was used, and it is for this purpose that the above oscillatory movement of stylus 184 is provided to produce offsets 222. This stylus oscillating mechanism is operated by the slowly moving index shaft 56 of the meter through the intermediacy of member 60 which intermittently oscillates lever 224, pivoted intermediate its ends at 226 to housing 64, which in turn is connected by link 228 to bell crank lever 230. This bell crank lever is pivoted at 232 to housing 64 and is adapted to oscillate rod 208 through link 234 which engages lever 236, securely attached to the outwardly projecting end of 208.

It will be observed that the slowly moving shaft 56 is the one that, when rotated through a complete revolution, indicates that one thousand cubic feet of gas has passed through the gas meter so that with four teeth on member 60, each offset 222 in line 220 would designate two hundred and fifty cubic feet of gas; however, this unit might be varied to change the unit volume recorded. Carriage member 198 is also provided with a lug 238, in opposed relation to the stylus carrying member 200, and is in parallel relation with the wall of housing 64. Positioned between housing 64 and lug 238, is a compression spring 240 that normally tends to maintain stylus 184 in a tensioned relation against chart 150, thereby allowing for a wearing away of the stylus without interfering with its proper contact relation with 150.

As stated above, the stylus 184 is normally held in operative relation with the surface of chart 150 and will at all times produce a line thereon during the operation of the chronometer; however, in order to facilitate reading of the chart throughout its entire circumference, it has been found expedient to disengage the stylus from chart 150 during the rotation of the chart in its opposite direction by means of key 70, as set forth above. This is accomplished by means of the following mechanism which is associated with the stylus-carrying parts. An operating bar 242, pivotally mounted by means of shaft 244 to casing 64, extends substantially the entire length of member 208 and is adapted to engage the outer end of lug 238 and move the stylus 184 away from chart 150.

The upper end of shaft 244 is provided with a rigidly attached arm 246 which is operatively engaged by lever 248, pivoted intermediate its ends at 250. The inner end 252 of lever 248 is positioned in the path of travel of key 70 as the same is being positioned on the squared portion 68 of shaft 66, thus causing lever 248 to be oscillated in the direction indicated by the arrow to move shaft 244, causing bar 242 to force stylus 184 away from the chart.

With the removal of the key from the operative position, these operating parts will be forced back to the normal position by means of spring 254 and against stop pin 256, thereby again permitting spring 240 to force the stylus against the chart.

The type of recording might be varied materially without departing from the broad idea of indicating the exact time that any given unit volume of gas passes through the meter. In the present showing it is contemplated that the small chart shown may revolve once a month and that the lead of the thread on member 186 be such that at least twelve convolutions of the helical line might be recorded, thereby making a full year's record of the gas flow through said meter. The chart 150, visible through opening 258 formed in housing 64, is also visible through the transparent portion 260 of door 262, mounted on casing 24 of the gas meter.

In the present specification and drawings I have disclosed a chronological gas recording device which is sufficiently accurate to show any discrepancy between the amount of gas that normally would be used and the amount that actually passes through the gas meter, thereby making it possible to detect any pilfering of gas due to tampering with the gas flow lines.

Having thus described the invention, what is claimed as new and desired to be secured by Letters Patent is:

1. A chronological gas recording apparatus comprising a rotatably mounted cylindrical chart; means including a governor controlled spring adapted to rotate said chart at a uniform rate of speed; a gas meter having a tangent arm and an index arm driven thereby; means operable by the tangent arm of said gas meter to wind said spring; means controlled by said spring to make said spring winding means ineffectual when the spring is in the substantially wound position; and a stylus, associated with said chart and means operable by said index shaft of said gas meter to operate said stylus, to record on said chart, unit volumes of gas passed through said gas meter; and means operable by said chart rotating means to move said stylus in accordance with time.

2. A chronological gas recording apparatus comprising a gas meter having a tangent arm and an index arm driven thereby; a rotatably mounted, cylindrical record chart; a movable stylus, means operable by the tangent arm of said gas meter to rotate said record chart at a uniform rate of speed; means operable by said last named means to move said stylus at a substantially uniform rate of speed transversely to the direction of rotation of said record chart whereby a helical line is produced by the stylus on the chart; and means including said stylus operable by said index arm of the gas meter to record each predetermined unit volume of gas passing through the meter on said chart and to record the time each unit volume was recorded.

3. A chronological gas recording apparatus comprising a gas meter having a tangent arm and an index arm; a rotatable chronometer chart having a driving spring motor; a movable stylus associated with said chart; means operable by the tangent arm of said gas meter to wind said chronometer spring motor; means operable by said chart to move said stylus in one direction; and means driven by said index arm of said gas meter to operate said stylus intermittently to record on said chronometer chart, predetermined units of gas as they pass through said gas meter.

4. A chronological gas recording apparatus comprising a gas meter having a tangent arm and an index arm driven thereby; a rotatably mounted endless chart having a driving spring motor; means operable by the tangent arm of said gas meter whereby said spring motor is wound; means associated with said spring winding means operable to make the spring winding means inoperable when the spring motor is completely wound; a stylus associated with said chart and operable by said spring driven endless chart and the index arm of said gas meter to record unit volumes of gas on said chart as they pass through said gas meter.

5. A chronological gas recording apparatus comprising a gas meter having a tangent arm and an index arm driven thereby; an axially mounted cylindrical chart; means operable by said tangent arm to rotate said cylindrical chart; a movable stylus normally contacting said chart; means operable by said last named means to move said stylus transversely to the direction of movement of said chart whereby a helical line is produced on said chart; and means operable by the index arm of said gas meter to oscillate the stylus to record the unit volumes of gas on the chart in spaced relation corresponding to the periods of time intervening between the passage of the unit volumes of gas through said meter.

CARRIE M. HYLE.